Figure 1:
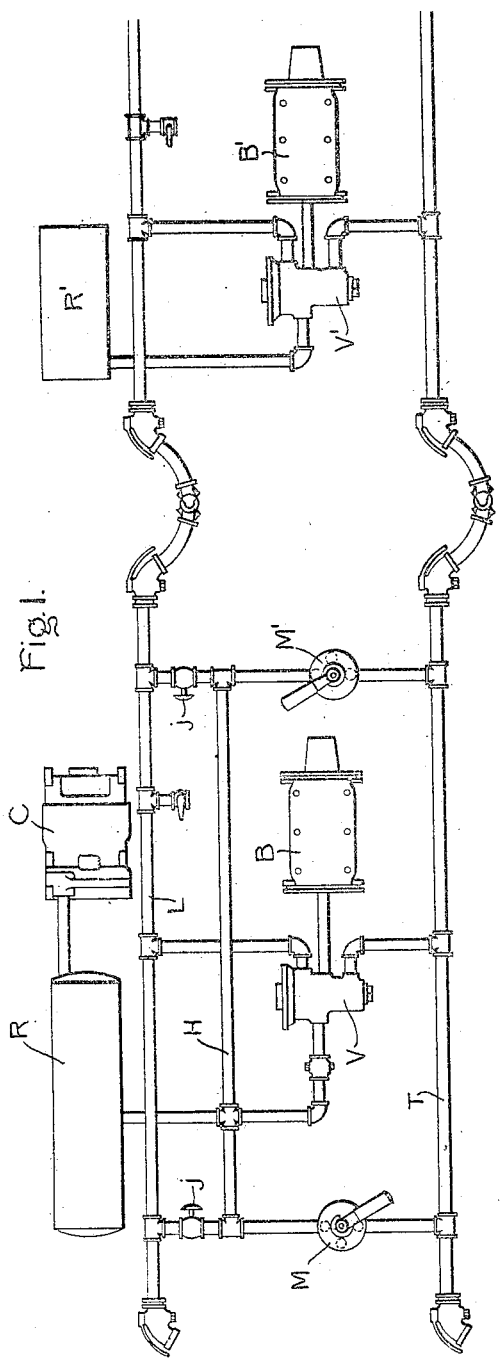

G. MACLOSKIE, JR.
AIR BRAKE SYSTEM.
APPLICATION FILED MAR. 20, 1905.

912,269.

Patented Feb. 9, 1909.

Witnesses

Inventor
George Macloskie Jr
by Albert G. Davis
Att'y.

UNITED STATES PATENT OFFICE.

GEORGE MACLOSKIE, JR., OF SCHENECTADY, NEW YORK, ASSIGNOR TO GENERAL ELECTRIC COMPANY, A CORPORATION OF NEW YORK.

AIR-BRAKE SYSTEM.

No. 912,269.  Specification of Letters Patent.  Patented Feb. 9, 1909.

Application filed March 20, 1905. Serial No. 250,894.

*To all whom it may concern:*

Be it known that I, GEORGE MACLOSKIE, Jr., a citizen of the United States, residing at Schenectady, county of Schenectady, State of New York, have invented certain new and useful Improvements in Air-Brake Systems, of which the following is a specification.

My invention relates to what is known as "straight" air-brake systems, and comprises a modification of the arrangement disclosed in a former application Serial No. 205,654, filed by me April 30, 1904. In this former application I described an air-brake system in which the advantages of both "straight" and "automatic" systems are obtained. The arrangement disclosed comprised the usual elements of a straight air-brake system, i. e., a main reservoir, a train-line connected to the brake cylinders, and a motorman's valve adapted to connect train-line to reservoir or to atmosphere to apply and to release the brakes. In addition to these usual elements, I employed a second train-line carrying air at reservoir pressure, a reservoir on each car, and a spring-actuated emergency valve on each car arranged to respond to a sudden lowering of pressure in the second train-line, such as would be caused by a breaking apart of the train, and adapted to disconnect brake cylinder from the first train-line and to connect it to the reservoir on that car. By means of this arrangement the advantages of the "straight" air system, as regards facility of control, were obtained for the usual service applications, and an emergency application on a breaking apart of the train, as in the "automatic" system was also secured.

In the arrangement of my former application the motorman's valve was connected to the main reservoir through the high-pressure train-line and emergency valve. While this arrangement is entirely satisfactory for short trains, I have discovered that on long trains where a large amount of air is required for applying the brakes in making a quick service stop, the pressure in the high-pressure train-line may be so much lowered as to produce an emergency application of the brakes when such an application is not desired.

My present invention consists in a modification of the former arrangement and comprises such a rearrangement of the connections of the system that the motorman's valve is connected directly to main reservoir independently of the high-pressure train-line and emergency valve, so that for service applications of the brakes the connections and operation are in every way identical with the usual straight air-brake system; the high-pressure train-line being in no way affected by the service applications. If, however, the train should break apart, the high-pressure train-line and emergency valve would immediately come into play and produce an emergency application of the brakes in the same manner as in the arrangement disclosed in my former application.

My present invention is thus especially adapted for use on long trains, but is also equally efficient and reliable on short trains.

My invention further comprises certain details in the arrangement and connections of the system, which will appear from the following specification, and will be more specifically pointed out in the appended claims.

My invention will best be understood by reference to the accompanying drawing, in which—

Figure 2:
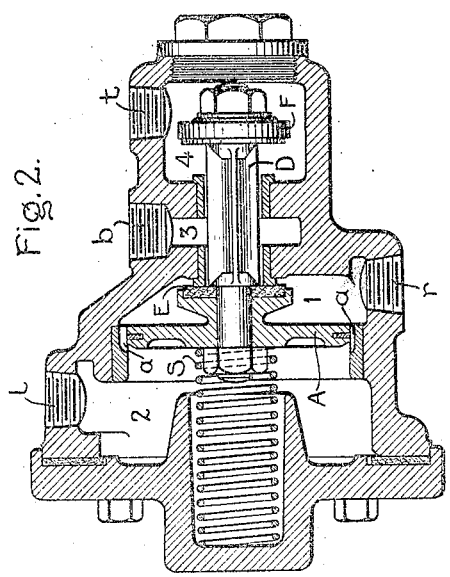

Figure 1 shows diagrammatically an air-brake system arranged in accordance with my invention; and Fig. 2 shows a cross-sectional view of the emergency valve.

In Fig. 1 R represents the main reservoir supplied from the compressor C and connected through a pipe H to motorman's valves M and M' at opposite ends of the car. These motorman's valves are also connected to the usual train-pipe T of a "straight" air-brake system. The train-pipe T is connected through an emergency valve V to the brake cylinder B. Since the emergency valve V, as will be hereinafter explained, is in such a position that the connection always exists under normal conditions between pipe T and brake cylinder B, the operation of the system is precisely the same, as regards the normal application of the brakes, as though valve V were omitted and the pipe T were connected directly to the brake cylinder in the usual manner. In other words, the connections for normal running and operation of the brakes are identical with those of the straight air-brake system.

A second train-line L is employed, as in my former application, which carries air at reservoir pressure, being normally connected to reservoir through the emergency valve V. I have shown direct pipe connections between pipes L and H for a purpose that will be hereinafter explained, but these connections are closed during normal operation by cocks *j j*, so that, except for the connection through the emergency valve V, the pipe L is entirely independent of the rest of the system. I have indicated in Fig. 1 one trailer provided with an emergency valve V' normally connecting brake cylinder B' to the train-pipe T, and also normally connecting the high-pressure train-line L to the auxiliary reservoir R'. Although I have shown this second car equipped as a trailer, it will be understood that my invention is equally applicable to a train composed of motor cars, the equipment of each being the same as that of the first car in Fig. 1; and further that a train may be composed of any number of cars, either motor cars or trailers, or both.

The auxiliary valve V is the same as described in my former application, but in order that my present invention may be clearly understood I shall briefly describe it here.

Referring to Fig. 2, the port connected to the main reservoir R is indicated by the reference character *r*. This port opens into a chamber 1, which is separated from the chamber 2 by a piston A. This piston carries a leather-seated valve E which, when the piston is in the position shown, separates chamber 1 from chamber 3. S is a compression spring which holds piston A normally in the position shown. Passages *a a* are provided around piston A, affording a restricted passage between the chambers 1 and 2 when piston A is in the position shown. *l* represents the port for the main reservoir line L opening out from chamber 2. Piston A also carries the valve F situated in chamber 4, into which opens the port *t* which is connected to the train-pipe T. The rod D connecting valve F to piston A is channeled out, as shown, so as to provide a communication between chambers 3 and 4 when piston A and valve F are in the position shown. From chamber 3 opens a port *b*, which is connected to the brake cylinder B. For ordinary service applications of the brake the valve V on the first car remains inoperative; for since the air for the brakes is taken directly from the reservoir, its only effect on the emergency valve is to lower the pressure in chamber 1, relatively to that in chamber 2, and this difference in pressure merely assists spring S in holding the valve more firmly in the position shown. The only function of the emergency valves on the other cars of the train during such service application is to allow the other reservoirs to supply air slowly through passages *a a* to compensate for any slight drop of pressure in line L that may be produced by taking air from the main reservoir. Since as this drop is due only to leakage through passages *a a* in the emergency valve on the first car from chamber 2 to chamber 1, it cannot be large enough to produce any movement of the other emergency valves. Consequently, whether the service application be sudden or gradual, and whether the train be long or short, the emergency valve does not come into play, and the operation is in every respect the same as in the usual straight air-brake system. If, however, the train should break apart, the high pressure train-line L would be opened to atmosphere and the pressure in chamber 2 of each emergency valve on the train would be suddenly lowered relatively to the pressure in chamber 1. The restricted passages *a a* in piston A, while sufficient in amount to maintain the pressure in the high-pressure line L, as far as ordinary leakage is concerned, are not of sufficient size to permit a quick equalization of pressure when the train-line is suddenly opened to atmosphere. Consequently the excessive pressure in chamber 1 forces piston A toward the left, thereby closing the passages *a a*, lifting the valve E and seating the valve F. The valve thus breaks the connection between brake cylinder B and train-pipe T, and connects brake cylinder directly to reservoir, producing an emergency application of the brake in the same manner as in my former system.

The cocks *j j*, which have been mentioned heretofore may be employed for releasing the brakes on a long train when they have been applied by a breaking of the train-line L. After the break in train-line L is closed, opening one of the cocks *j* will raise the train-line pressure again to normal, so as to return the emergency valves to their normal position. Conductor's valves are shown in the two cars in Fig. 1 by means of which an emergency application may be obtained when desired by opening the train-line L on any car to atmosphere.

It will be understood that I have illustrated my invention somewhat diagrammatically, and any well-known forms of apparatus may be employed. Accordingly, I do not desire to limit myself to the particular construction and arrangement of parts here shown, but aim in the appended claims to cover all modifications which are within the scope of my invention.

What I claim as new, and desire to secure by Letters Patent of the United States, is,—

1. In combination with a "straight" air-brake system, a reservoir on each car, a pipe-line extending through the train and normally connected to each reservoir through a restricted passage, an emergency valve on each car adapted to close said passage and to connect reservoir to brake cylinder upon a sudden lowering of the pressure in said train-line, a connection between said train-line and reservoir independent of said emergency valve, and a normally closed valve in said connection.

2. In an air-brake system, the combination with a main reservoir and a motorman's valve directly connected thereto, of a straight air-pipe arranged to be connected to said main reservoir through said motorman's valve, brake-cylinders and auxiliary reservoirs on one or more cars, a second train-pipe normally carrying air under pressure, and an automatic valve device for each brake cylinder having yielding resistance means for normally holding the same in position to establish communication from the straight air-pipe to the brake cylinder and arranged to be operated by a reduction of pressure in the second train-pipe to open communication from the auxiliary reservoir to the brake-cylinder.

3. In an air-brake system, the combination with a main reservoir and a motorman's valve directly connected thereto, of a straight air-pipe arranged to be connected to said main reservoir through said motorman's valve, a second train-pipe normally carrying air under pressure, brake cylinders and auxiliary reservoirs on one or more cars, said auxiliary reservoirs being normally connected to said second train-pipe through restricted passages, and an automatic valve device for each brake cylinder having yielding resistance means for normally holding the same in position to establish communication from the straight air-pipe to the brake cylinder and arranged to be operated by a reduction of pressure in the second train-pipe to open communication from the auxiliary reservoir to brake cylinder.

In witness whereof I have hereunto set my hand this 16th day of March, 1905.

GEORGE MACLOSKIE, Jr.

Witnesses:
BENJAMIN B. HULL,
HELEN ORFORD.